United States Patent
Deguchi et al.

(10) Patent No.: US 9,444,335 B2
(45) Date of Patent: Sep. 13, 2016

(54) SWITCHING REGULATOR CONTROL CIRCUIT AND SWITCHING REGULATOR

(71) Applicant: Seiko Instruments Inc., Chiba-shi, Chiba (JP)

(72) Inventors: Michiyasu Deguchi, Chiba (JP); Kosuke Takada, Chiba (JP); Tetsuya Makino, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 0 days.

(21) Appl. No.: 14/610,792

(22) Filed: Jan. 30, 2015

(65) Prior Publication Data
US 2015/0222180 A1 Aug. 6, 2015

(30) Foreign Application Priority Data
Feb. 6, 2014 (JP) .................... 2014-021662

(51) Int. Cl.
*H02M 3/156* (2006.01)
*H02M 1/00* (2006.01)

(52) U.S. Cl.
CPC ..... *H02M 3/156* (2013.01); *H02M 2001/0025* (2013.01); *H02M 2003/1566* (2013.01)

(58) Field of Classification Search
CPC .................................................. H02M 3/156
See application file for complete search history.

(56) References Cited

U.S. PATENT DOCUMENTS

| 7,038,436 | B2* | 5/2006 | Goto ..................... H02M 1/32 323/277 |
|---|---|---|---|
| 2004/0245974 | A1 | 12/2004 | Kitani et al. |
| 2005/0206361 | A1* | 9/2005 | Ito ......................... H02M 3/156 323/282 |
| 2006/0238182 | A1 | 10/2006 | Yoshino |
| 2007/0145961 | A1* | 6/2007 | Hasegawa ............... H02M 1/38 323/282 |
| 2009/0237049 | A1* | 9/2009 | Hachiya ................ H02M 3/156 323/282 |
| 2011/0043175 | A1 | 2/2011 | Sohma |
| 2012/0001551 | A1 | 1/2012 | Abe et al. |
| 2012/0299568 | A1 | 11/2012 | Kumagai et al. |

FOREIGN PATENT DOCUMENTS

JP    6-233525 A    8/1994

OTHER PUBLICATIONS

Extended European Search Report in corresponding European Application No. 15153783.4, dated Jun. 16, 2015, 8 pages.

* cited by examiner

*Primary Examiner* — Emily P Pham
(74) *Attorney, Agent, or Firm* — Brinks Gilson & Lione

(57) ABSTRACT

Provided is a switching regulator configured to achieve a 100% Duty state and reduce an occurrence of an overshoot. The switching regulator has a configuration in which a clamp circuit configured to dynamically generate a clamp level clamps an output voltage of an error amplifier in accordance with a peak value of a triangular wave signal.

4 Claims, 6 Drawing Sheets

SWITCHING REGULATOR CONTROL CIRCUIT AND SWITCHING REGULATOR

RELATED APPLICATIONS

This application claims priority under 35 U.S.C. §119 to Japanese Patent Application No. 2014-021662 filed on Feb. 6, 2014, the entire content of which is hereby incorporated by reference.

BACKGROUND OF THE INVENTION

1. Field of the Invention

The present invention relates to a switching regulator configured to output a constant voltage, and more specifically, to a circuit configured to suppress an overshoot of an output voltage.

2. Description of the Related Art

A switching regulator is used as a voltage supply source for circuits of various electronic devices. The switching regulator has a function of outputting a constant voltage to an output terminal irrespective of a fluctuation in voltage of an input terminal. The switching regulator is required to output a voltage that is as close as possible to a set voltage of the output terminal even in a region where the voltage of the input terminal has been low and the set voltage cannot be maintained. It is important that, when the voltage of the input terminal recovers from this state to enable the supply of the set voltage value to the output terminal, the voltage of the output terminal transitions to the set voltage without any overshoot. For this reason, clamping of an output voltage of an error amplifier has hitherto been performed.

FIG. 7 is a block diagram illustrating a switching regulator including a clamp circuit.

The related-art switching regulator includes a triangular wave generating circuit 3, an error amplifier 31, a PWM comparator 27, a buffer 6, operational amplifiers 5 and 17, resistors 9, 13, 15, and 25, a capacitor 11, diodes 7 and 19, a reference voltage circuit 23, a power transistor 40, a diode 42, a coil 41, and a capacitor 43.

The reference voltage circuit 23 outputs a reference voltage Vref. The triangular wave generating circuit 3 outputs a triangular wave Vramp oscillating between an upper limit level voltage VH and a lower limit level voltage VL thereof. The error amplifier 31 compares a feedback voltage Vfb of an output voltage Vout of the switching regulator and the reference voltage Vref of the reference voltage circuit 23, and amplifies a difference between those voltages. The PWM comparator 27 compares a voltage Vent output from the error amplifier 31 and the triangular wave Vramp to output a signal Vpwm.

The operational amplifier 5 forming a voltage follower circuit buffers and outputs the triangular wave Vramp. The capacitor 11 is connected to an output terminal of the operational amplifier 5 via the diode 7 and the resistor 9, and hence the upper limit level voltage VH of the triangular wave Vramp is held. The resistors 13 and 15 forming a voltage divider circuit divide the voltage VH held at the capacitor 11 to output a voltage Vclamp. The operational amplifier 17 forming a voltage follower circuit buffers and outputs the voltage Vclamp. The diode 19 has a cathode connected to an output terminal of the operational amplifier 17 and an anode connected to an output terminal of the error amplifier 31 via the resistor 25. The circuits described above form a clamp circuit.

Thus, when a voltage Verr output from the error amplifier 31 reaches the voltage Vclamp, the operational amplifier 17 draws a current to control the voltage Verr so as not to exceed the voltage Vclamp. In other words, the voltage Verr' of an inverting input terminal of the PWM comparator 27 does not exceed the upper limit level voltage of the triangular wave Vramp being the other voltage input to the PWM comparator 27.

As described above, in the related-art switching regulator, a switching Duty becomes higher as the voltage Verr approaches a high potential side of the triangular wave Vramp. Consequently, even when a high Duty is required due to a low power supply voltage or an excessive load current state, the voltage Verr falls within an amplitude range of the triangular wave Vramp. With this, the voltage Verr can quickly transition to a next operating point when the voltage recovers from the low power supply voltage or when the excessive load current state ends, and hence magnitude of an overshoot occurring in the output voltage Vout can be reduced.

In this manner, the clamp circuit of the related-art switching regulator circuit prevents the excessive overshoot from occurring in the output voltage Vout even when the voltage of the input terminal significantly fluctuates as represented by a cold crank.

However, the related-art switching regulator including the clamp circuit has a disadvantage in that the switching is always performed even when the voltage of the input terminal has been low, and hence a state in which the input terminal and the output terminal are connected in a DC manner (hereinafter referred to as "100% Duty state"), which is required in a step-down switching regulator, cannot be achieved.

When it is assumed that the clamp circuit limits the maximum Duty of the step-down switching regulator to $\alpha\%$, a maximum output voltage Vout(max) corresponds to a value obtained by multiplying a voltage VIN of the input terminal by $\alpha$. That is, Vout(max)=$\alpha$VIN holds.

Now, when it is assumed that a set value Vouts of the output voltage Vout is 5 V, the voltage VIN of the input terminal is 4 V, and $\alpha$ is 90%, Vout=4 V×90%=3.6 V holds. Under this condition, the voltage VIN of the input terminal falls below the set value of the output voltage Vout, and hence the 100% Duty, that is, $\alpha$=100% is essentially desired. A voltage of 4 V is output as Vout if $\alpha$=100% holds, but the voltage drops by about 0.4 V due to the limitation of $\alpha$.

SUMMARY OF THE INVENTION

In order to solve the related-art problem, a switching regulator control circuit according to one embodiment of the present invention has the following configuration.

The switching regulator control circuit includes: a triangular wave generating circuit configured to generate a triangular wave; an error amplifier configured to compare a reference voltage and a voltage based on an output voltage; a comparator configured to compare a signal based on the triangular wave and an output signal of the error amplifier; a peak hold circuit configured to hold a voltage obtained by adding an offset voltage to an upper limit voltage of the signal based on the triangular wave; and a clamp circuit configured to clamp an output terminal of the error amplifier based on a voltage output from the peak hold circuit.

According to a step-down switching regulator including the switching regulator control circuit of one embodiment of the present invention, under a condition in which the maximum Duty is required, the switching regulator control circuit clamps the output terminal of the error amplifier to a voltage higher than the triangular wave signal by a certain degree. Thus, a switching output becomes a 100% Duty state so that an output voltage has substantially the same value as a voltage of an input terminal. In addition, an output of the error amplifier transitions from a level relatively close to the peak value of the triangular wave signal when the voltage of the input terminal is further increased to recover the switching output from the 100% Duty state to a normal state. Thus, a recovery time may be shortened and the switching regulator may be quickly released from a state in which the switching output at a High level is steadily output. Consequently, there is provided an effect of reducing an excessive overshoot that is liable to occur when the switching regulator recovers from the 100% Duty state.

DETAILED DESCRIPTION OF THE PREFERRED EMBODIMENTS

Figure 1:
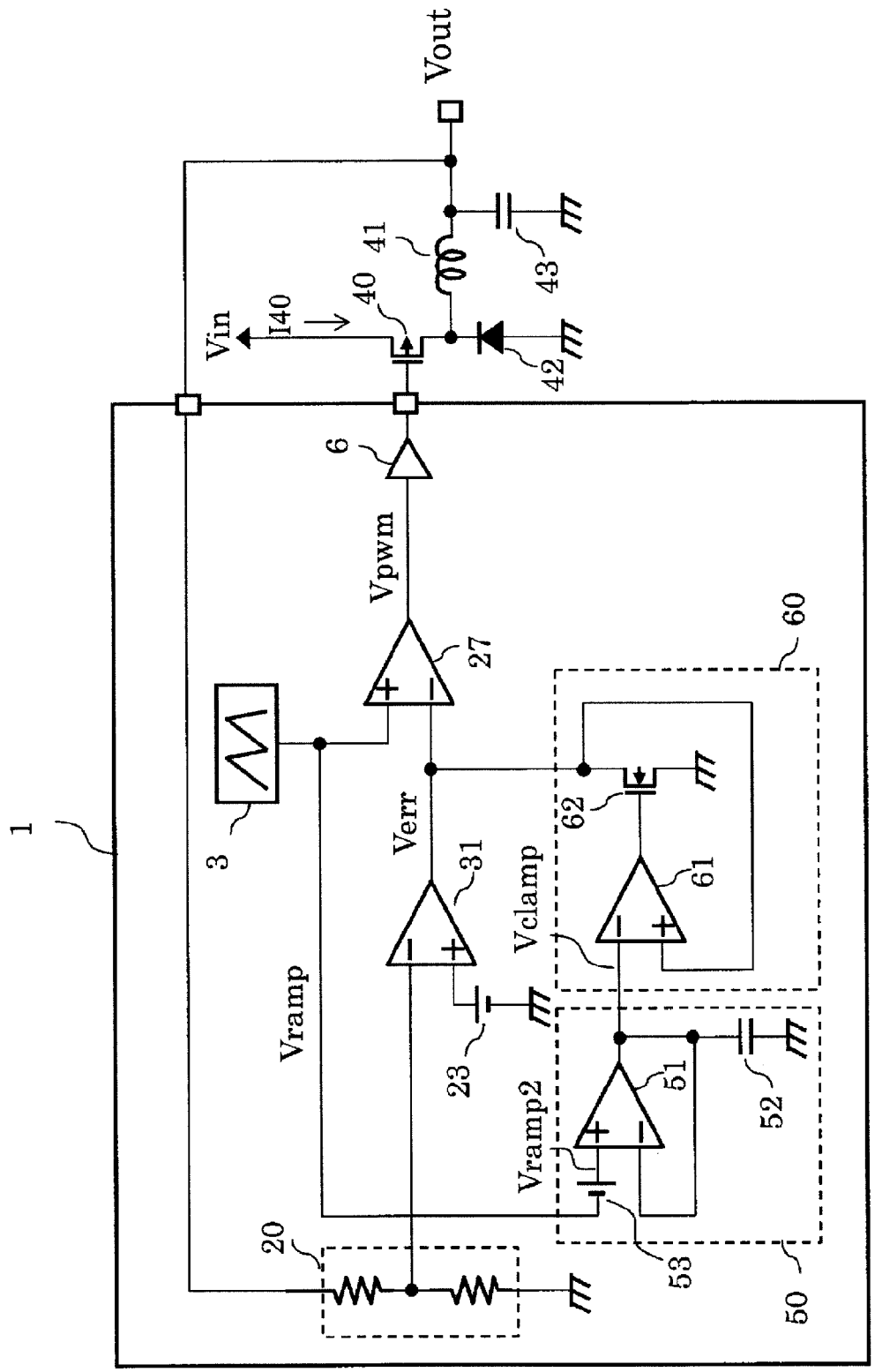
FIG. 1 is a block diagram of a switching regulator according to a first embodiment of the present invention.

FIG. 1 is a block diagram of a switching regulator according to a first embodiment of the present invention. The block diagram of FIG. 1 illustrates an example of a voltage mode switching regulator.

The switching regulator of this embodiment includes a switching regulator control circuit 1, a power transistor 40, a coil 41, a diode 42, and a capacitor 43.

The switching regulator control circuit 1 includes a triangular wave generating circuit 3, a reference voltage circuit 23, an error amplifier 31, a PWM comparator 27, a buffer 6, a voltage divider circuit 20, a peak hold circuit 50, and a clamp circuit 60.

The peak hold circuit 50 includes an operational amplifier 51, a capacitor 52, and an offset circuit 53. The clamp circuit 60 includes an operational amplifier 61 and an N channel transistor 62.

The voltage divider circuit 20 is connected between an input terminal to which an output voltage Vout is input and a ground terminal. The error amplifier 31 has a non-inverting input terminal connected to the reference voltage circuit 23 and an inverting input terminal connected to an output terminal of the voltage divider circuit 20. The triangular wave generating circuit 3, which outputs a triangular wave Vramp oscillating between an upper limit level voltage VH and a lower limit level voltage VL thereof, has an output terminal connected to a non-inverting input terminal of the PWM comparator 27 and an input terminal of the peak hold circuit 50. The peak hold circuit 50 has an output terminal connected to an input terminal of the clamp circuit 60. The PWM comparator 27, which has an inverting input terminal connected to an output terminal of the error amplifier 31 and an output terminal of the clamp circuit 60, is connected to an output terminal via the buffer 6.

The operational amplifier 51 has a non-inverting input terminal connected to the input terminal of the peak hold circuit 50 via the offset circuit 53, an inverting input terminal connected to the output terminal, and an output terminal connected to the output terminal of the peak hold circuit 50 and the ground terminal via the capacitor 52.

The operational amplifier 61 has an inverting input terminal connected to the input terminal of the clamp circuit 60 and an output terminal connected to a gate of the N channel transistor 62. The N channel transistor 62 has a drain connected to a non-inverting input terminal of the operational amplifier 61 and the output terminal of the clamp circuit 60, and a source connected to the ground terminal.

Next, an operation of the switching regulator of this embodiment is described.

The offset circuit 53 is a circuit configured to offset the triangular wave Vramp on a positive potential side. In other words, the offset circuit 53 outputs a triangular wave Vramp2 obtained by adding an offset voltage Voffset to the triangular wave Vramp. The offset voltage Voffset is set, for example, to about 100 mV to about 500 mV.

The operational amplifier 51 forming a voltage follower circuit has a sink current capability that is suppressed to be extremely low. For example, a sink current of 10 cycles of the triangular wave Vramp or more is required to discharge 50% of charges of the capacitor 52. On the other hand, a source current of only about 1 or 2 cycles of the triangular wave Vramp is required to charge the capacitor 52 by the peak value of the triangular wave Vramp2. Thus, a clamp voltage Vclamp corresponding to the peak value of the triangular wave Vramp2 is held at the capacitor 52.

Figure 6:
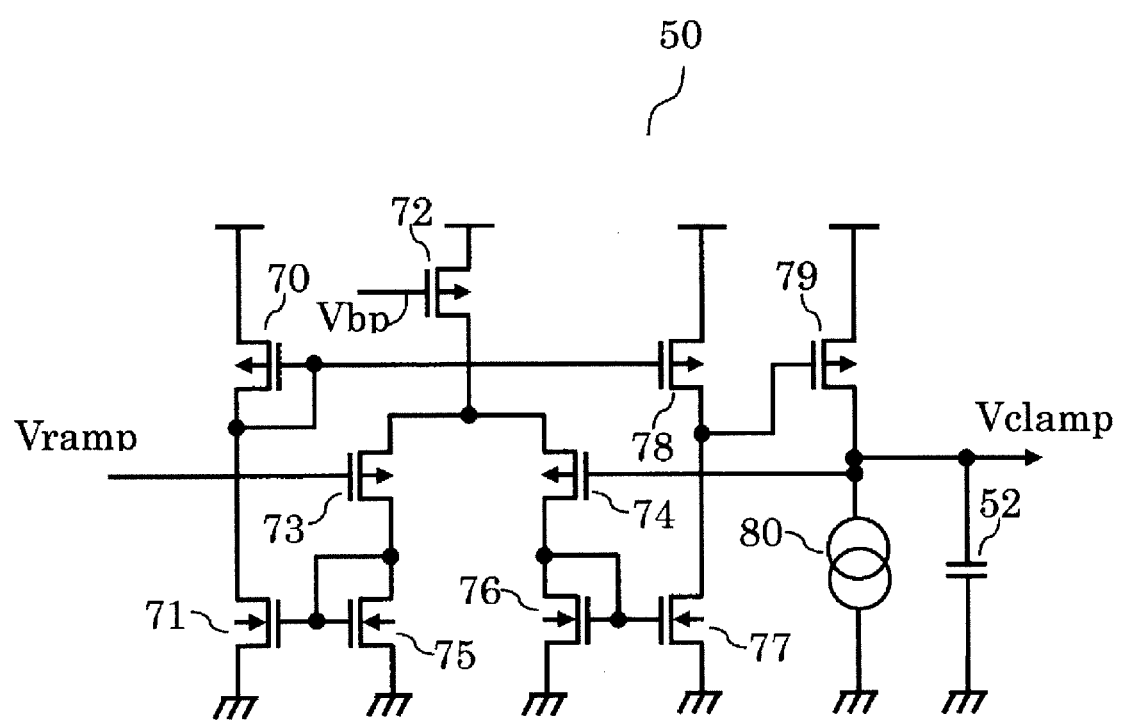
FIG. 6 is a circuit diagram illustrating an example of a peak hold circuit.
Figure 7:
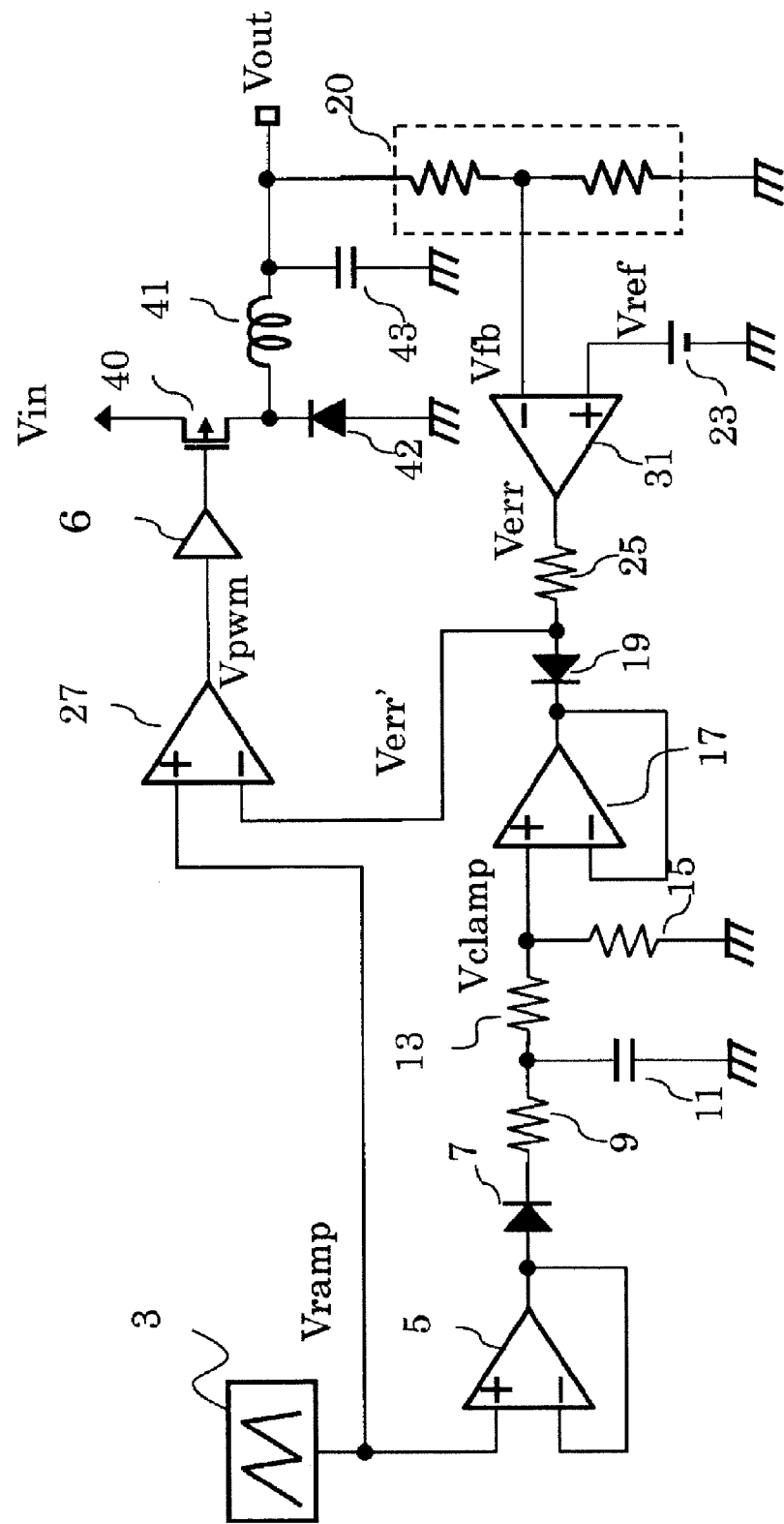
FIG. 7 is a block diagram of a related-art switching regulator including a clamp circuit.

FIG. 6 is a circuit diagram illustrating an example of the peak hold circuit 50. Transistors 70 to 79 and a constant current source 80 form the operational amplifier 51. The constant current source 80 has a significantly small current value with respect to a current supply capability of the transistor 79. The transistor 74 has a K value larger than that of the transistor 73, and has an input offset voltage of hundreds of mV. With this configuration, the peak hold circuit 50 outputs the clamp voltage Vclamp obtained by level shifting the input triangular wave Vramp on the high potential side by the offset voltage Voffset.

The clamp voltage Vclamp output from the peak hold circuit 50 is input to the input terminal of the clamp circuit 60. In the clamp circuit 60, the operational amplifier 61 functions as a voltage follower circuit to sink a current from the drain of the N channel transistor 62, that is, the output terminal. Thus, when a voltage Verr output from the error amplifier 31 is increased to the clamp voltage Vclamp, the current sink operation of the clamp circuit 60 starts so that the voltage Verr is clamped at a level of the clamp voltage Vclamp.

Figure 2:
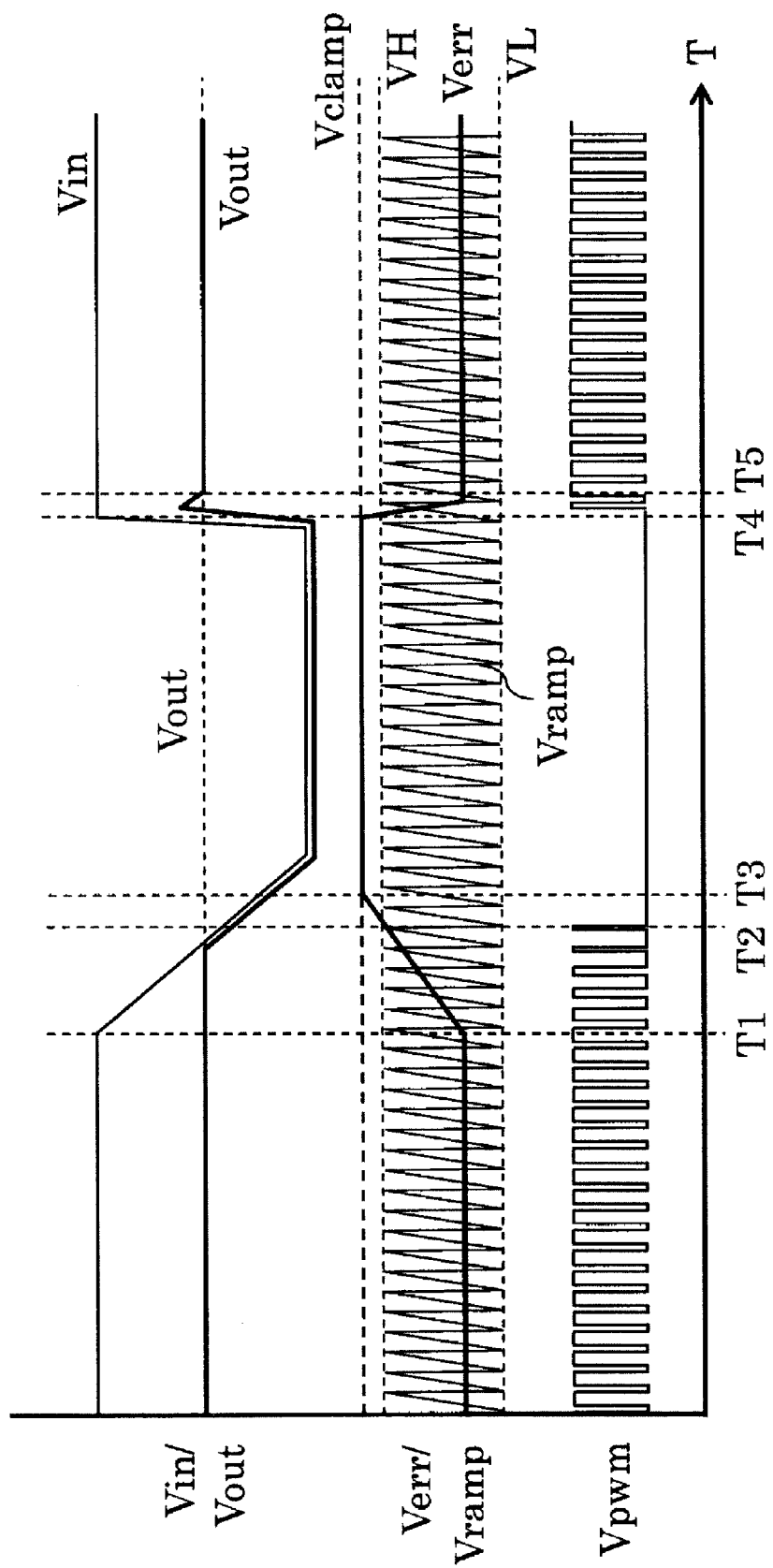
FIG. 2 is a timing chart illustrating an operation of a switching regulator of the first embodiment.

FIG. 2 is a timing chart illustrating the operation of the switching regulator of this embodiment.

Until a time T1, the input voltage Vin is normal and the voltage Verr output from the error amplifier 31 is a voltage between the upper limit level voltage VH and the lower limit level voltage VL of the triangular wave Vramp. Thus, the switching regulator is in a normal operation state of performing the switching operation in response to a signal Vpwm output from the PWM comparator 27.

In this case, if the input voltage Vin greatly drops and the output voltage Vout falls below the set value (Vouts), the voltage Verr output from the error amplifier 31 exceeds the upper limit level voltage VH of the triangular wave Vramp (time T2). This state corresponds to a 100% Duty state in which the signal Vpwm output from the PWM comparator 27 is always low level to maintain the power transistor 40 in an ON state.

Even if the input voltage Vin further drops, the voltage Verr is clamped at the level of the clamp voltage Vclamp when the voltage Verr is increased to the clamp voltage Vclamp (time T3). Thus, even if the output voltage Vout greatly drops, the voltage Verr is not greatly increased but is maintained at the level of the clamp voltage Vclamp (period from T3 to T4). In other words, the voltage Verr output from the error amplifier 31 is held at a level with a relatively small voltage difference from the upper limit level voltage VH of the triangular wave Vramp.

Then, when the input voltage Vin recovers to the normal voltage, the voltage Verr quickly becomes a voltage falling within the amplitude range of the triangular wave Vramp, and hence the switching regulator can quickly recover to the normal switching state (period from T4 to T5). Thus, an overshoot of the output voltage Vout can be reduced.

As described above, the switching regulator of this embodiment can shorten a time period during which excessive energy is supplied to the output terminal and can thus reduce the overshoot of the output voltage Vout.

Figure 3:
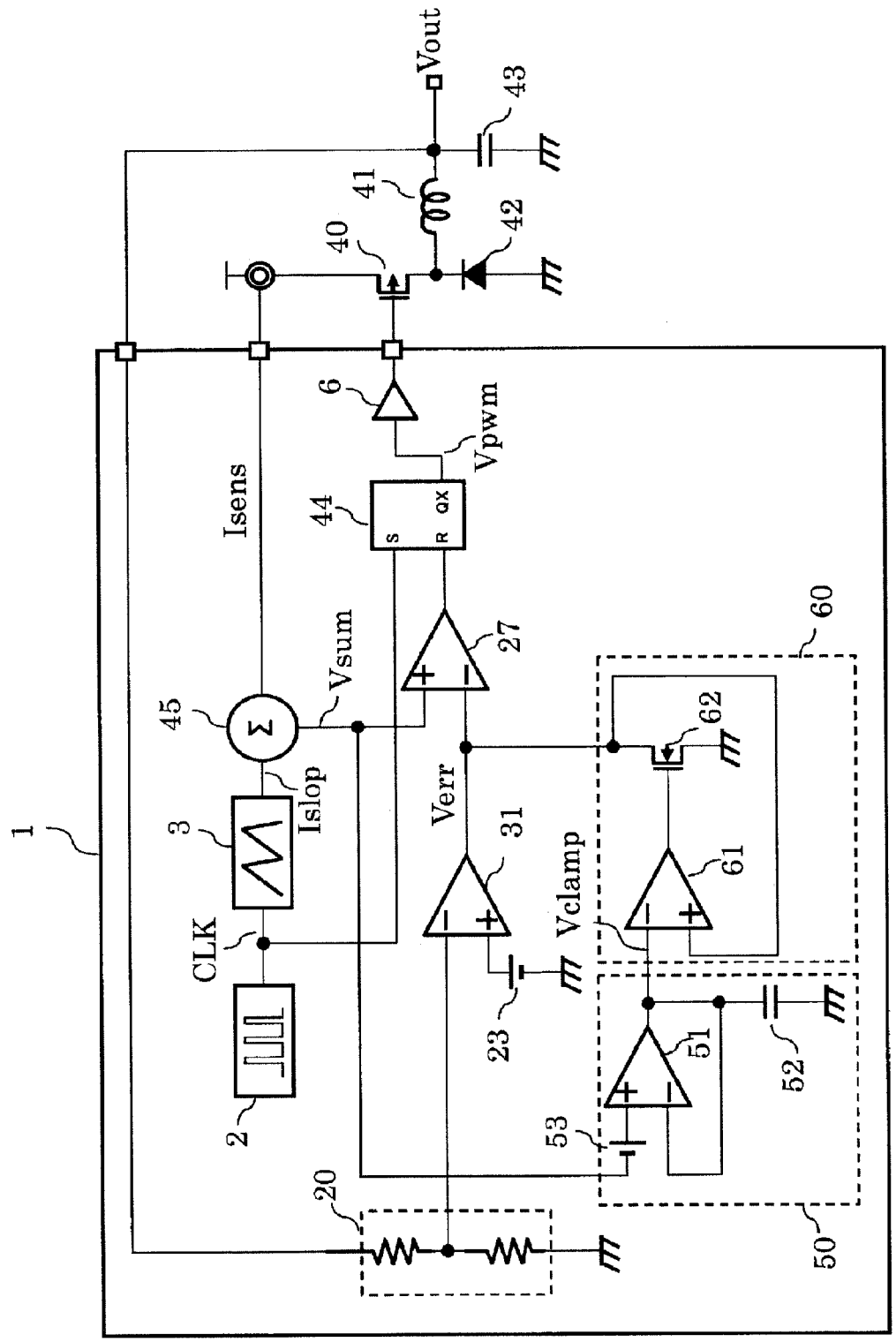
FIG. 3 is a block diagram of a switching regulator according to a second embodiment of the present invention.

FIG. 3 is a block diagram of a switching regulator according to a second embodiment of the present invention. The block diagram of FIG. 3 illustrates an example of a current mode switching regulator.

A square wave oscillator circuit 2, a current adding circuit 45, and a flip-flop circuit 44 are added to the circuit of the switching regulator of FIG. 1.

A square wave CLK of the square wave oscillator circuit 2 is a set signal of the flip-flop circuit 44. When the flip-flop circuit 44 is in a set state, the signal Vpwm is low level to turn on the power transistor 40. In addition, the square wave CLK is also input to the triangular wave generating circuit 3. The triangular wave generating circuit 3 generates a current signal Islop based on the square wave CLK to output the generated current signal Islop to the current adding circuit 45. A current signal Isens representing an amount of current flowing through the power transistor 40 is also input to the current adding circuit 45. The current adding circuit 45 adds the current signal Islop and the current signal Isens together to output the resultant signal as a voltage signal Vsum. The voltage signal Vsum is input to the non-inverting input terminal of the PWM comparator 27. The PWM comparator 27 outputs a reset signal to the flip-flop circuit 44 when the voltage Verr, which is output from the error amplifier 31 and is input to the inverting input terminal of the PWM comparator 27, becomes a voltage equal to the voltage signal Vsum. When the flip-flop circuit 44 is in a reset state, the signal Vpwm is high level to turn off the power transistor 40.

Figure 4:
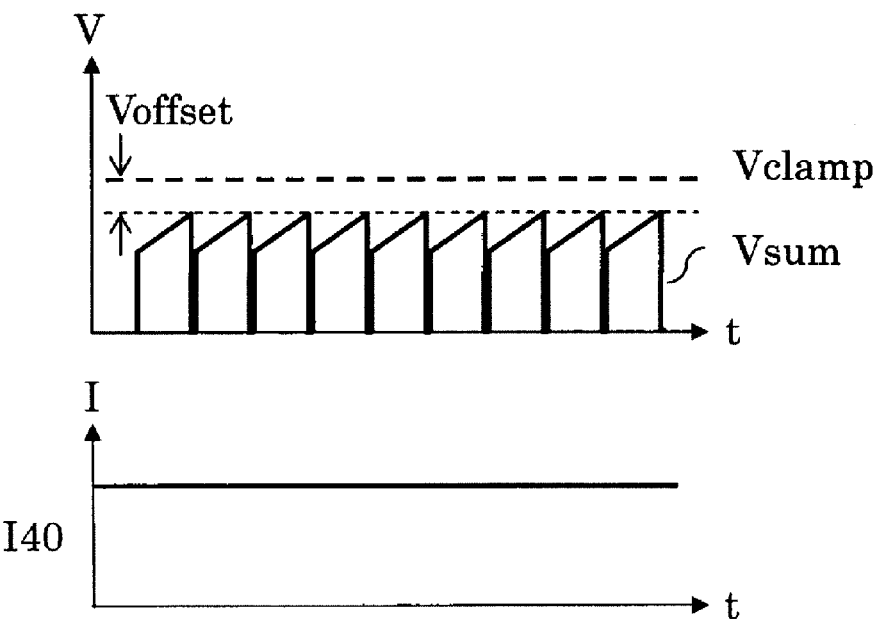
FIG. 4 is a graph showing a voltage signal Vsum with a large load current in a 100% Duty state.
Figure 5:
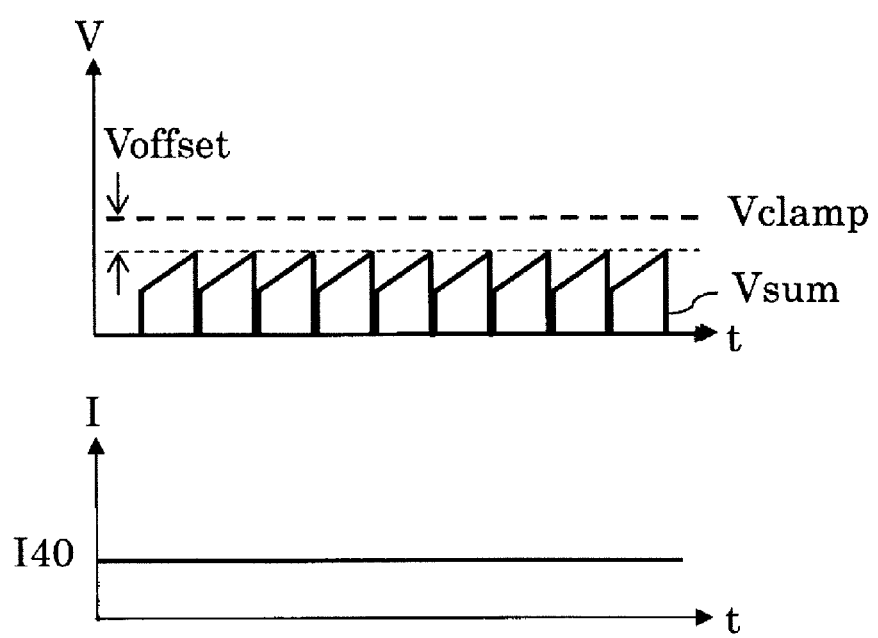
FIG. 5 is a graph showing the voltage signal Vsum with a small load current in the 100% Duty state.

The voltage signal Vsum is a signal containing an amount of current flowing through the output terminal, and hence the error amplifier 31 adjusts an amount of current to be supplied to the output terminal. In other words, the voltage Verr is increased to be equal to the voltage signal Vsum for a longer time period when a large amount of current is to be supplied to the output terminal. Thus, amplitude of the voltage signal Vsum becomes larger. On the contrary, the voltage Verr and the voltage signal Vsum immediately intersect with each other when a small amount of current is to be supplied to the output terminal, and hence the amplitude of the voltage signal Vsum becomes smaller. Thus, unlike the voltage mode switching regulator of the first embodiment, an amplitude value of a voltage signal to be input to the non-inverting input terminal of the PWM comparator is not a fixed value. Further, when the 100% Duty state is achieved, the voltage Verr exceeds the upper limit side of the voltage signal Vsum so that the voltage Verr and the voltage signal Vsum no longer intersect with each other. At this time, a current 140 flowing through the power transistor 40 is a direct current, but the current signal Islop continuously operates as described above so that the voltage signal Vsum is a triangular wave signal also in this case. The amplitude of the voltage signal Vsum changes depending on a current flowing through the power transistor 40. In other words, as shown in FIG. 4 and FIG. 5, the amplitude of the voltage signal Vsum changes depending on a load current in the 100% Duty state. FIG. 4 is a graph showing the voltage signal Vsum with a large load current in the 100% Duty state. FIG. 5 is a graph showing the voltage signal Vsum with a small load current in the 100% Duty state.

In this case, the voltage signal Vsum is also input to the peak hold circuit 50. Thus, because the peak hold circuit 50 and the clamp circuit 60 generate the clamp voltage Vclamp for each cycle of the voltage signal Vsum, the clamp voltage Vclamp following a fluctuation in voltage signal Vsum can be obtained. The clamp circuit 60 of this embodiment operates similarly to that of the switching regulator of the first embodiment, and hence even if the output voltage Vout greatly drops, the voltage Verr output from the error amplifier 31 is held at a level with a relatively small voltage difference from the amplitude upper limit of the voltage signal Vsum. Thus, when the input voltage Vin recovers to the normal voltage, the voltage Verr can quickly have an intersection with the voltage signal Vsum, and hence the switching regulator can quickly recover to the normal switching state. Then, a time period during which excessive energy is supplied to the output terminal can be shortened and the overshoot of the output voltage Vout can thus be reduced.

What is claimed is:

1. A switching regulator control circuit configured to control an output transistor connected to an output terminal, to thereby output a predetermined voltage, the switching regulator control circuit comprising:
   a triangular wave generating circuit configured to generate a triangular wave;
   an error amplifier configured to compare a reference voltage and a voltage based on an output voltage;
   a comparator configured to compare a signal based on the triangular wave and an output signal of the error amplifier;
   a peak hold circuit configured to hold a voltage obtained by adding an offset voltage to an upper limit voltage of the signal based on the triangular wave; and
   a clamp circuit configured to clamp an output terminal of the error amplifier based on a voltage output from the peak hold circuit.

2. A switching regulator control circuit according to claim 1, wherein the signal based on the triangular wave comprises a signal obtained through addition of a current signal component based on a current flowing through the output transistor.

3. A switching regulator, comprising:
   the switching regulator control circuit according to claim 1; and
   an output circuit comprising an output transistor connected to an output terminal of the switching regulator control circuit.

4. A switching regulator, comprising:
   the switching regulator control circuit according to claim 2; and an output circuit comprising an output transistor connected to an output terminal of the switching regulator control circuit.

* * * * *